UNITED STATES PATENT OFFICE.

MICHAEL JLJINSKY, OF CREFELD, GERMANY, ASSIGNOR TO R. WEDEKIND & CO., OF UERDINGEN-ON-THE-RHINE, GERMANY.

PRODUCTION OF ORGANIC SULFONIC ACIDS.

No. 847,078.

Specification of Letters Patent.

Patented March 12, 1907.

Application filed July 14, 1903. Serial No. 165,426.

*To all whom it may concern:*

Be it known that I, MICHAEL JLJINSKY, a subject of the Emperor of Russia, residing in Crefeld, in the Empire of Germany, have invented certain new and useful Improvements in the Production of Organic Sulfonic Acids, of which the following is a specification.

It has been proposed to sulfonate anthrachinone in the presence of mercury or mercury compounds, thereby obtaining the ortho (1) anthrachinone-mono-sulfonic acid or the ortho (1.5 and 1.8) disulfonic acids. I have found also that other new sulfonic acids of the anthrachinone may be obtained if the sodium salt of the 2.6 disulfonic acid or of the 2.7 disulfonic acid or a mixture of the two salts, as such a mixture is obtained in usual sulfonating, are further treated with fuming sulfuric acid in the presence of mercury or mercury compounds.

Example I: One hundred parts of anthrachinone 2.6 disulfonic-acid sodium, one part mercury sulfate, and two hundred parts fuming sulfuric acid of forty per cent. free $SO_3$ are slowly heated to 160° centigrade and kept there for about 2.5 hours. The sulfo salt passes gradually into solution. The sulfonated mixture on cooling forms a homogeneous tenacious mass and is exceedingly easily soluble in water. The aqueous solution is neutralized with chalk, freed from gypsum, and concentrated. The resulting calcium-sodium salt of the new sulfo-acid is amorphous and very easily soluble in water. A five-per-cent. solution of the salt, with either chlorid of calcium or sulfate of copper, or acetate of lead, or concentrated hydrochloric acid in like volume, gives no precipitation of the corresponding salts or free sulfonic acid. The salt may be by melting with lime easily transformed into hitherto unknown oxy-anthrachinone-sulfonic acid, which will dye mordanted wool a fine violet-red. Anthrachinone 2.6 disulfonic-acid sodium treated in the same way, with fuming sulfuric acid, but without the addition of mercury, remains unchanged and yields in melting with lime anthraflavin acid.

Example II: One hundred parts of anthrachinone 2.7 disulfonic-acid sodium, one part mercury sulfate, and two hundred parts fuming sulfuric acid of forty per cent. free $SO_3$ are slowly heated to about 150° centigrade and kept there two hours. The dark-brown sulfonated mixture on cooling remains clear, but becomes of a tenacious consistency. The aqueous sulfonic-acid solution is neutralized with chalk, freed from gypsum, and concentrated. The resulting calcium-sodium salt of the new acid is likewise amorphous and very easily soluble in water, and a five-per-cent. solution thereof, likewise with either chlorid of calcium, or sulfate of copper, or acetate of lead, or concentrated hydrochloric acid in like volume, gives no precipitation of the corresponding salts or free sulfonic acid. By melting with lime there is obtained a hitherto unknown oxy-anthrachinone-sulfonic acid, which will dye mordanted wool a fine violet-red. Anthrachinone 2.7 disulfonic-acid sodium treated in the same way with fuming sulfuric acid, but without the addition of mercury, remains unchanged and yields in melting with lime isoanthraflavin acid.

As the two acids obtained according to Examples I and II are analogous, it is obvious that in practice also the mixture may be employed which results from the usual sulfonating of the anthrachinone, which mixture contains the 2.6 and 2.7 disulfonic acid.

The new acids are to be used to obtain important dyestuffs.

I claim as my invention—

1. The new useful more basic anthrachinone-sulfonic acids having one sulfonic group in the ortho (1) position, forming a calcium-sodium salt, being amorphous and very easily soluble in water and yielding in melting with lime new oxy-anthrachinone-sulfonic acids for dyeing mordanted wool a fine violet-red.

2. Process for obtaining the described new anthrachinone-sulfonic acids consisting in sulfonating the sodium salt of the anthrachinone 2.6 disulfonic acid with fuming sulfuric acid in the presence of mercury.

In testimony whereof I have signed my name to this specification in the presence of two subscribing witnesses.

MICHAEL JLJINSKY.

Witnesses:
   CHAS. F. HENSLEY,
   BRUCE WALLACE.